US011182963B2

(12) United States Patent
Yeh

(10) Patent No.: US 11,182,963 B2
(45) Date of Patent: Nov. 23, 2021

(54) COMPUTERIZED SYSTEM AND METHOD FOR PROVIDING A MOBILE AUGMENTED REALITY ITEM DISPLAY AND SELECTION EXPERIENCE

(71) Applicant: POSNAP, INC., Alhambra, CA (US)

(72) Inventor: Mao Shen Yeh, Taoyuan (TW)

(73) Assignee: POSNAP, INC., Alhambra, CA (US)

(*) Notice: Subject to any disclaimer, the term of this patent is extended or adjusted under 35 U.S.C. 154(b) by 0 days.

(21) Appl. No.: 16/374,167

(22) Filed: Apr. 3, 2019

(65) Prior Publication Data

US 2020/0320791 A1    Oct. 8, 2020

(51) Int. Cl.
*G06T 19/00* (2011.01)
*G06T 7/73* (2017.01)
*G06N 20/00* (2019.01)
*G06K 9/00* (2006.01)

(52) U.S. Cl.
CPC ........ *G06T 19/006* (2013.01); *G06K 9/00281* (2013.01); *G06N 20/00* (2019.01); *G06T 7/74* (2017.01)

(58) Field of Classification Search
CPC .................................................. G06T 19/006
See application file for complete search history.

(56) References Cited

U.S. PATENT DOCUMENTS

| 9,064,344 B2 | 6/2015 | Smith et al. | |
| 2005/0229251 A1* | 10/2005 | Chellapilla | G06Q 10/107 |
| | | | 726/23 |
| 2010/0271365 A1* | 10/2010 | Smith | G06T 15/205 |
| | | | 345/419 |
| 2013/0063487 A1* | 3/2013 | Spiegel | G06Q 30/02 |
| | | | 345/633 |
| 2013/0170738 A1* | 7/2013 | Capuozzo | G06K 9/66 |
| | | | 382/159 |
| 2015/0193435 A1* | 7/2015 | Siddhartha | G06F 40/197 |
| | | | 707/756 |
| 2017/0032577 A1* | 2/2017 | Smith | G06K 9/00369 |
| 2018/0336715 A1* | 11/2018 | Rickwald | G06K 9/00315 |
| 2018/0365898 A1* | 12/2018 | Costa | G06F 3/011 |
| 2019/0377969 A1* | 12/2019 | Kuo | G06T 7/90 |

* cited by examiner

*Primary Examiner* — Yi Yang
(74) *Attorney, Agent, or Firm* — Nicholas Martin; Greenberg Traurig, LLP

(57) ABSTRACT

Disclosed are systems and methods for detecting the specific positioning, orientation, plane(s) and scale of a real-world object, and providing an augmented reality (AR) experience of the object based therefrom. The disclosed systems and method provide a novel, efficient and accurate mechanism for launching an AR application that provides an AR view of a captured or currently being viewed image. The instant disclosure's AR positioning and tracking systems and methods provide a streamlined system that maximizes the device's computational resources in order to accurately determine and track the viewed object's and the capturing device's positioning and orientation, as well as the object's physical dimensions, thereby ensuring an efficiently produced AR experience.

16 Claims, 17 Drawing Sheets

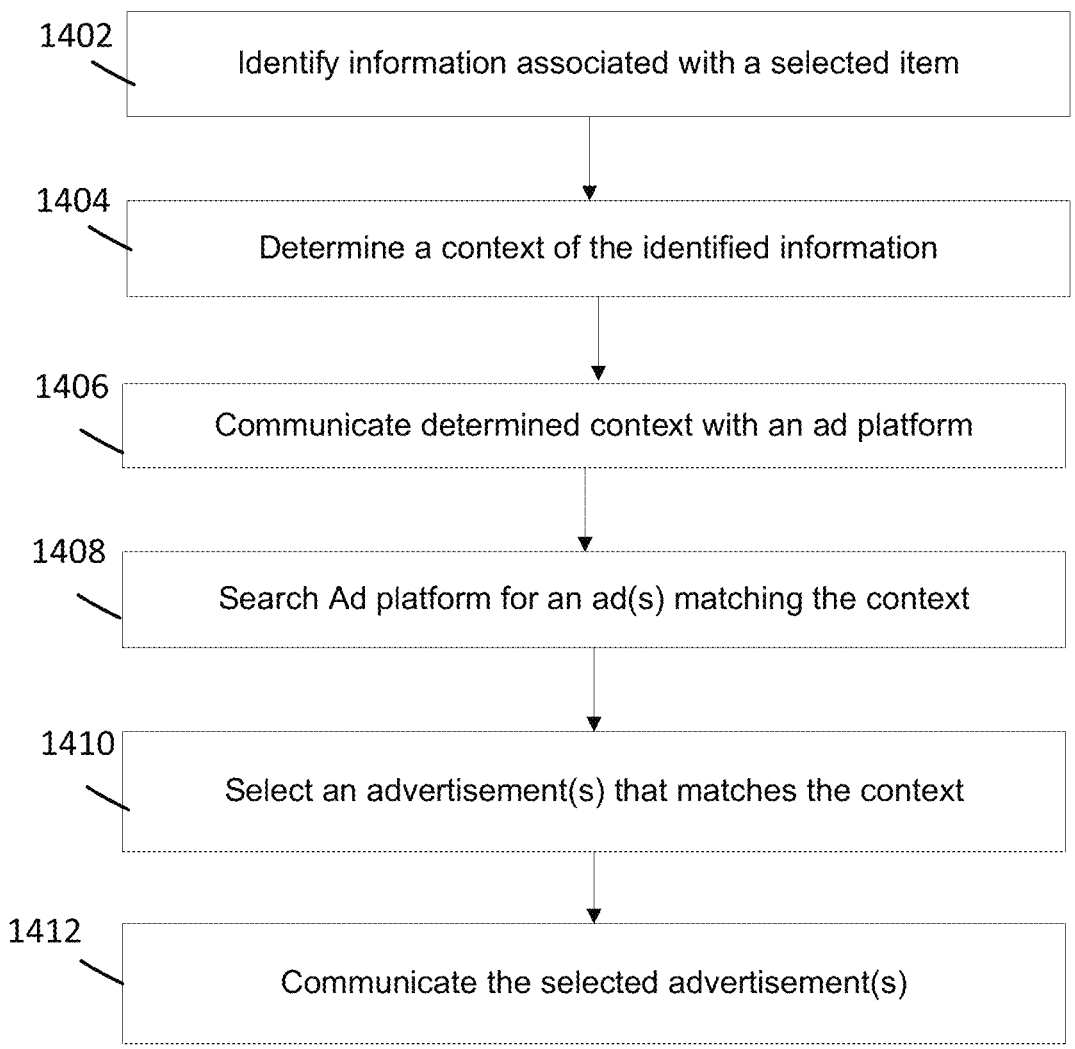
FIG. 14        1400

COMPUTERIZED SYSTEM AND METHOD FOR PROVIDING A MOBILE AUGMENTED REALITY ITEM DISPLAY AND SELECTION EXPERIENCE

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure generally relates to augmented reality (AR) systems, devices and applications executing on devices, and more particularly, to a mobile device executing an AR application that provides an AR view of a user such that the user is capable of viewing how a real-world item looks or otherwise would appear when the user is actually wearing the item.

BACKGROUND

Augmented reality applications allow a user to view a presentation of the world augmented with or superimposed by computer-generated imagery. The imagery can be, for example, graphical or textual, static or dynamic, interactive, and/or some combination thereof. The presented world may be provided directly to the user, such that when the user is looking through a displayed interface, the augmented imagery is applied to or projected on the interface appearing as integrated with the physical world.

Augmented reality (AR) is now being implemented on mobile computing devices that include digital cameras or other image sensors. In such implementations, the view that is currently being captured by the camera can be displayed as a scene on a screen of the mobile device. However, conventional systems that perform image recognition analysis in order to determine the positioning of an applied AR layer or AR integration can be inefficient, inaccurate and tie-up a great deal of a device's processing resources (e.g., memory and processing power).

SUMMARY

The disclosed systems and methods provide a technical solution to existing technical problems, especially those highlighted above, by providing a novel framework for accurately providing and aligning the digital augmentation to a physical object regardless of the size, position, orientation or shape of the digital object. The disclosed systems and methods provide a novel, efficient and accurate mechanism for launching an AR application that provides an AR view of a captured or currently being viewed image. The instant disclosure's AR positioning and tracking systems and methods provide a more efficient system than those executing on/within conventional systems by maximizing the device's computational resources in order to efficiently and accurately determine the viewed object's positioning and orientation respective to the viewing/capturing device thereby ensuring an efficiently and accurately rendered AR experience.

According to some embodiments of the instant disclosure, the disclosed systems and methods provide an AR application that provides an AR view on a device of a user such that the user is capable of viewing how a real-world item looks or otherwise would appear when the user is actually wearing the item. Before AR was capable, users needed to go to physical stores to view how jewelry looked and appeared physically on them. The disclosed AR framework provides a completely online environment that enables users to try on jewelry in the digital realm, where the AR framework automatically fits (or scales) jewelry pieces to them and shows how it will actually look. Rather than simply applying a filter to a user's display image, as in conventional AR systems, the disclosed technology can integrate the jewelry item to the user's displayed characteristics (or features) such that the item is fit and adjusted to the digital representation of a user.

Therefore, in accordance with one or more embodiments, the instant disclosure provides computerized methods for executing the AR positioning and tracking mechanisms disclosed herein, as well as a non-transitory computer-readable storage medium for carrying out the above mentioned technical steps of the AR framework. The non-transitory computer-readable storage medium has tangibly stored thereon, or tangibly encoded thereon, computer readable instructions that when executed by a device (e.g., application server, client device, and the like) cause at least one processor to perform a method for determining tracking and positioning of an AR system, as well as carrying out the AR on an image(s)/scene(s).

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 14 is a block diagram illustrating an exemplary data flow in accordance with embodiments of the present disclosure.

DESCRIPTION OF EMBODIMENTS

Figure 1:
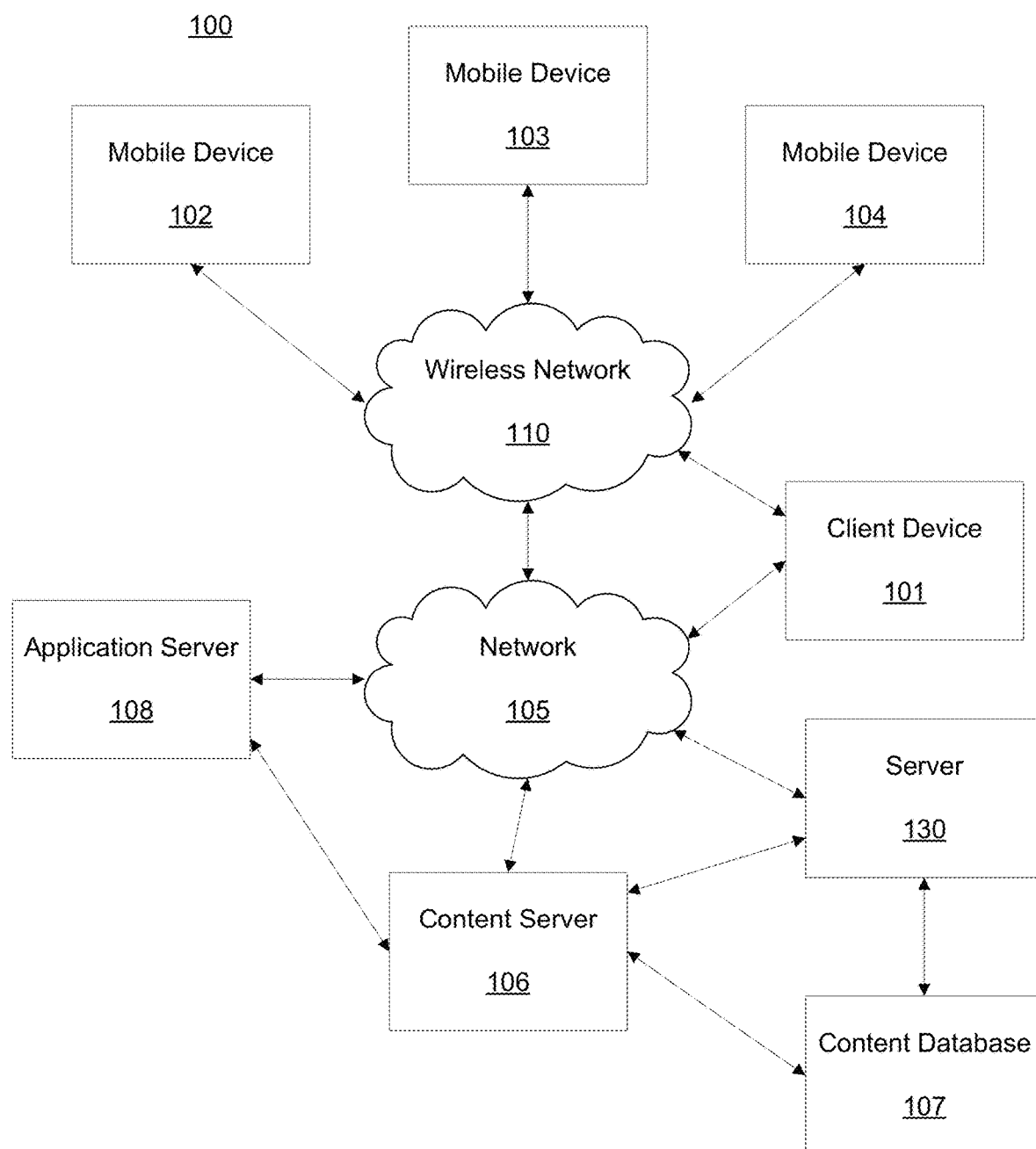
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. According to some embodiments, the instant disclosure provides advanced systems and methods for determining the position and orientation of an object being viewed by a capturing device (e.g., a smartphone). The rotation and movement of the device is tracked via the disclosed systems and methods discussed herein. Therefore, the implementation of the disclosed systems and methods provide a precise position of the real-world object to be augmented, which is then used to properly provide accurate AR imagery overlaid thereon. In addition to the speed and efficiency in which the positioning, tracking and AR implementation is achieved through the disclosed systems and methods, the implementation of the disclosed mechanisms enables AR to be accurately rendered in scenarios where 3D image capture and recognition may be ineffective, such as when the portions of the viewed real-world object is obscured (e.g., either hidden behind other objects, such as a person's clothing or hair, for example), as evidenced from the disclosure herein.

According to embodiments of the disclosed systems and methods, the disclosed AR framework will be discussed with reference to an AR application executing on a user's device and thereby providing the user with an AR experience so that the user can accurately view how a piece of jewelry will look and appear on the user should the user actually be wearing the jewelry. See, for example, FIGS. 11B-11C, discussed below. That is, the AR engine 300, as discussed below with reference to FIGS. 3-11D, provides a user with the ability to select a piece of jewelry, whereby the AR application executing on the user's device accurately fits and displays the jewelry to the digital representation being depicted on the display of the user's device—see FIGS. 11B and 11C, for example. Therefore, the user is capable of virtually trying on the jewelry without having to actually, or physically, try it on.

While the discussion herein will focus on how jewelry is displayed within the AR experience provide by the disclosed framework, it should not be construed as limiting, as any type of real-world item can be utilized without departing from the scope of the disclosed systems and method. That is, for example, one of ordinary skill in the art would understand that the item overlaid a user's digital representation displayed on a user's device can be any type of real-world item, such as, but not limited to, a hat, shirt, pants, or any other type of clothing, or a wig, glasses or any other type of form of item a user may wear.

Therefore, the instant disclosure will reference an "item" as a piece of jewelry (e.g., earrings or necklaces, for example). However, this is done for purposes of clarity with regard to detailing the steps, techniques and mechanisms of the disclosed systems and methods in accordance with some embodiments, and should not be understood by one of skill the art as limiting as the "item(s)" can take any form or shape.

Moreover, while the discussion herein will focus on how an item is displayed on a single user's digital representation within the AR view disclosed herein, it should not be so limiting, as any number of users can be detected and displayed within the AR view and have an item(s) displayed therewith. That is, for example, two users can be captured by a user's camera and have their pictures displayed within the interface of the AR application, whereby a selected item can then be displayed via the AR techniques provided herewith on each user's digital representation.

As discussed in more detail below at least in relation to FIG. 12, according to some embodiments, information associated with, derived from, or otherwise identified from, during or as a result of the generated and displayed AR view, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, generating and providing AR media, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, photo services, web services, AR services, recommendation services, purchasing services, email services, instant messaging (IM) services, streaming and/or downloading media services, search services, social networking services, news services, third-party services, audio services, video services, SMS services, MMS services, FTP services, voice over IP (VOIP) services, or the like.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, AR servers, application servers, photo-sharing servers, live-streaming servers, authentication servers, search servers, email servers, social networking services servers, SMS servers, IM servers, MIMS servers, exchange servers, via the network 105 using their various devices 101-104.

In some embodiments, applications, such as a jewelry purchasing application (referred to as the AR application herein), for example, or other forms of application, such as, but not limited to, mail applications (e.g., Gmail®, and the like), blog, photo or social networking application (e.g., Facebook®, Twitter® and the like), search application, and the like, can be hosted by the application server 108 or content server 106 and the like.

Thus, the application server 108, for example, can store various types of applications and application related information including application data and user profile information (e.g., traits, features and/or characteristics of a user, and/or identifying and behavioral information associated with a user, for example). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
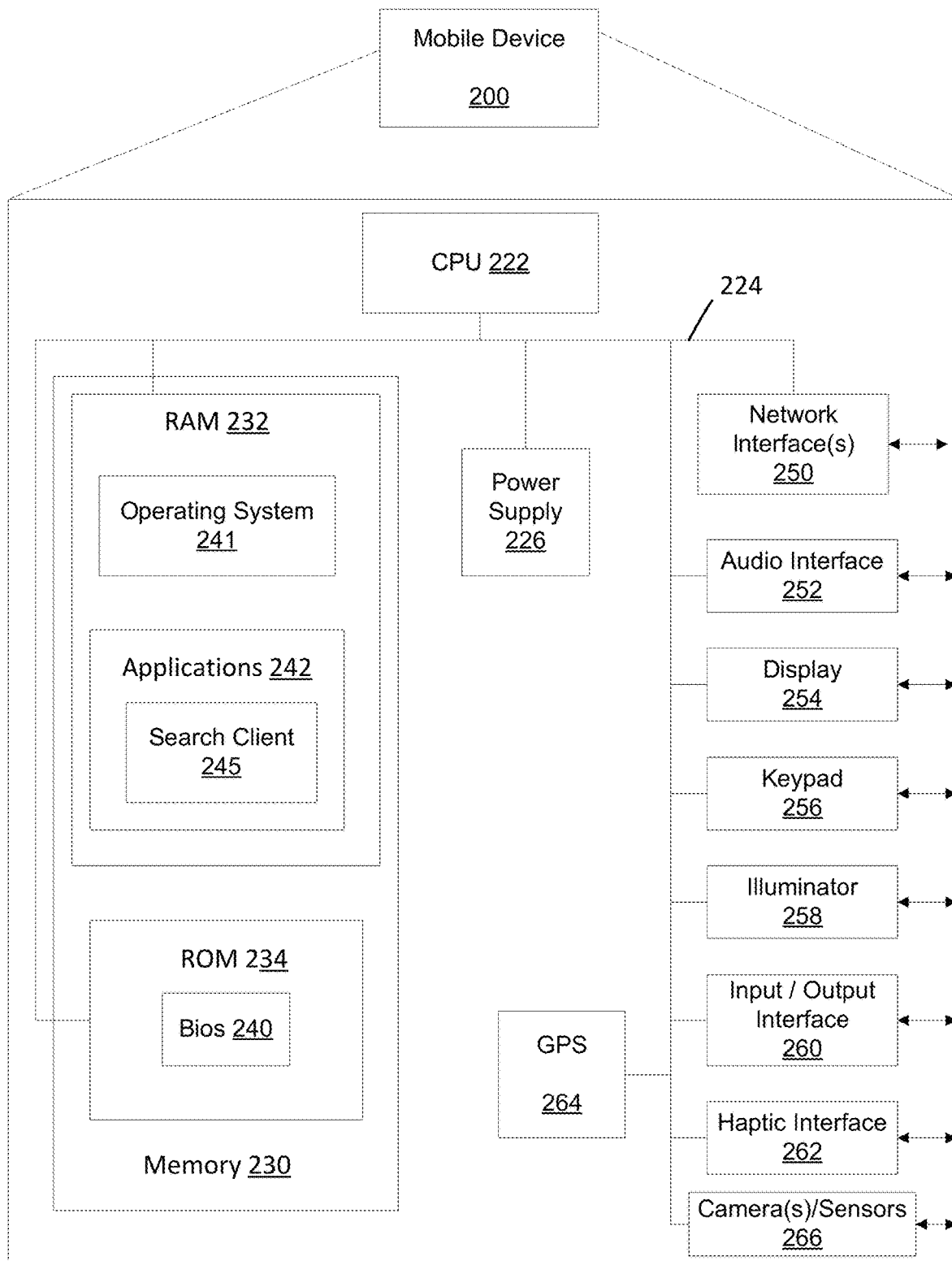
FIG. 2 depicts is a schematic diagram illustrating an example of client device in accordance with embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
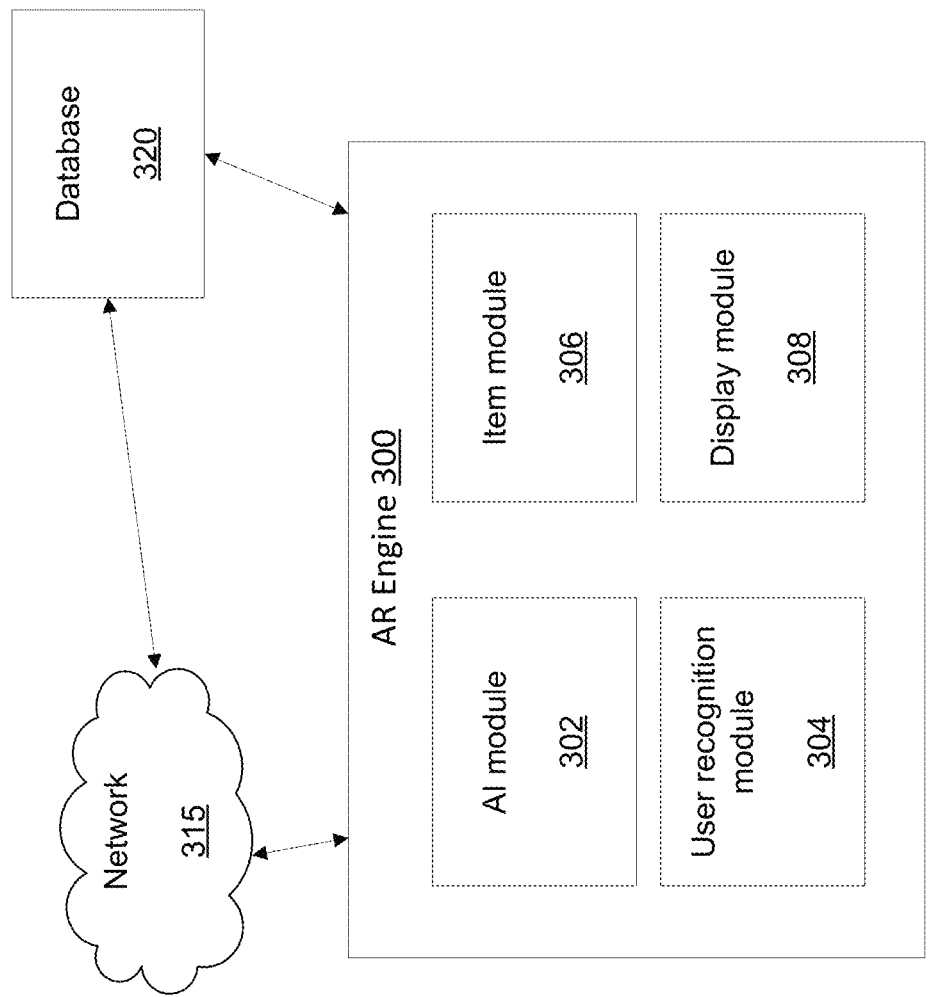
FIG. 3 is a block diagram illustrating components of an exemplary system in accordance with embodiments of the present disclosure.

FIG. 3 is a block diagram illustrating the components for performing the systems and methods discussed herein. FIG. 3 includes augmented reality (AR) engine 300, network 315 and database 320. The AR engine 300 can be a special purpose machine or processor and could be hosted by an application server, content server, social networking server, web server, email server, search server, content provider, third party server, user's computing device, and the like, or any combination thereof.

According to some embodiments, AR engine 300 can be embodied as a stand-alone application that executes on a user device. In some embodiments, the AR engine 300 can function as an application installed on the user's device, and in some embodiments, such application can be a web-based application accessed by the user device over a network. In some embodiments, the AR engine 300 can be installed as an augmenting script, program or application (e.g., a plug-in or extension) to another application, such as, for example, a photo-sharing or chat application where a user's digital representation is captured and utilized for purposes of the application (e.g., SnapChat®, Instagram®, and the like).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user traits, features or characteristics, display features of the user (as discussed below), user preferences or settings, user demographic information, user location information, user biographic information, and the like, or some combination thereof.

In some embodiments, the user data can also include user device information, including, but not limited to, device identifying information, device capability information, voice/data carrier information, Internet Protocol (IP) address, applications installed or capable of being installed or executed on such device, and/or any, or some combination thereof.

It should be understood that the data (and metadata) in the database 320 can be any type of information related to a user, content, a device, an application, a service provider, a content provider, whether known or to be known, without departing from the scope of the present disclosure.

According to some embodiments, information related to, derived from or otherwise determined by the AR view experience can be stored in database 320 as n-dimensional vector (or feature vector), where the information can be translated as a node on the n-dimensional vector for a user and/or a selected item. In some embodiments, each user and/or item can have its own vector where the information included therein can be represented by the nodes on a respective vector.

In some embodiments, information compiled to produce an AR experience/view for a user (e.g., an item integrated within the view of a user's digital representation) can be sent/received, detected and/or tracked, and can also be stored in the database 320 in a similar manner. In some embodiments, such storage can be encrypted, for example using a 256-bit encryption, such that the user's data is private only upon the user granting a third party access (e.g., via the AR application being authenticated to provide a token or key thereby allowing the third party access to the user's information).

Database 320 can store and index user/item information in database 320 as linked set of user and item data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for users and/or items.

As discussed above, for purposes of the present disclosure, as discussed above, items (which have their information stored and located in database 320), which reference jewelry objects, as a whole are discussed within some embodiments; however, it should not be construed to limit the applications of the systems and methods discussed herein, as any form of wearable object (e.g., clothing, fabric, or technology) can be processed by the AR engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the AR engine 300, and the database of stored resources 320. Indeed, as illustrated in FIG. 3, the AR engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as AR engine 300, and includes artificial intelligence (AI) module 302, user recognition module 304, item module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
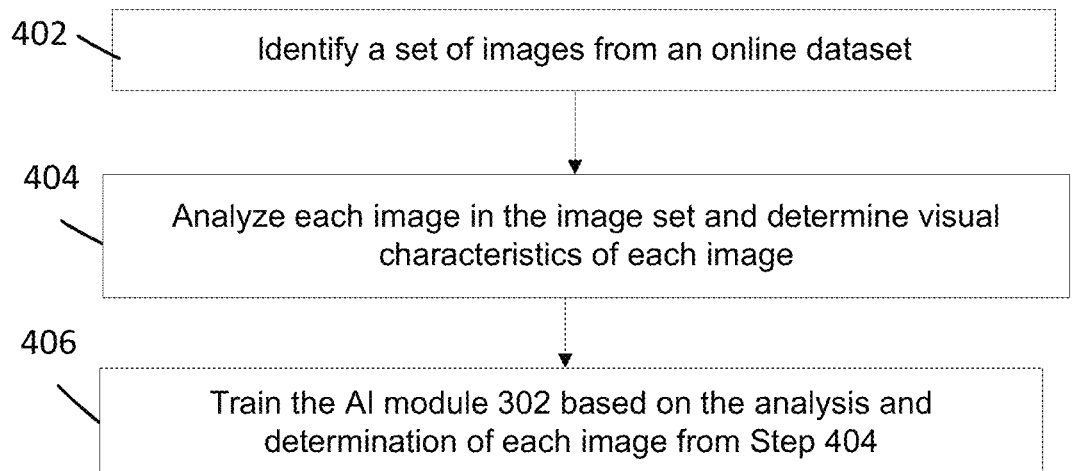
FIG. 4 is a flow diagram illustrating components of an exemplary artificial intelligence (AI) system in accordance with embodiments of the present disclosure

Turning to FIG. 4, Process 400 provides an example data flow that details embodiments of the disclosed framework for providing computer vision and machine learning tools within an augmented reality (AR) landscape for the detection of features of a user's digital representation. The discussion herein will focus on the detection of a user's facial features (e.g., eyes, mouth, face, nose); however, it should not be viewed as limiting, as any feature of a user's depiction can be utilized as part of providing an AR view, without departing from the scope of the disclosed systems and methods.

According to some embodiments of Process 400 of FIG. 4, Steps 402-404 of Process 400 are performed by the AI module 302 of the AR engine 300. As discussed herein, the AI module 302 can implement any known or to be known machine learning algorithm, technique, mechanism or toolkit, which can be embodied as a cross-platform software library, that enables the implementation and utilization of computer vision, machine learning and/or neural network algorithms, techniques or mechanisms. For example, the AI module 302 can implement a software toolkit, such as, but not limited to Dlib, and such algorithms can include, but are not limited to, Sparse Factor Analysis (SFA), Artificial Neural Networks (ANN), Deep Neural Networks (DNN), Convolutional Neural Networks (CNN), Hidden Markov Models (HMMs), Support Vector Machines (SVMs), Bayesian Methods, and the like Process 400 beings with Step 402 where an image catalog is identified and a set of training images are identified therein. As discussed herein, the images in the catalog are utilized to train the AI module 302. In some embodiments, the image catalog is an open, online dataset of training images. In some embodiments, the image catalog can be based on a dataset of user generated content (UGC) images. In some embodiments, the image catalog can be a combination thereof.

In some embodiments, the set of images from the catalog can be a sub-set of the entirety of the catalog, and in some embodiments, the set can be the entirety of the catalog. In embodiments where the image set is a sub-set, the number of images in the set can be in accordance with a predetermined number of images—for example, using 8,000 images.

In Step 404, each image in the identified set from Step 402 is analyzed in order to determine visual characteristics of each image. In some embodiments, as discussed in more detail below, the analysis involves parsing each image in the set and identifying, based on the parsed data, the data and/or metadata that provides information indicating an image's visual characteristics (or features, descriptors, parameters or attributes). These characteristics can relate to a user's facial features, which can include, but are not limited to, a user's eyes, eyebrows, forehead, nose, hairline, lips, mouth, facial hair, ears, chin, jawline, skin tone, and the like.

In some embodiments, such analysis can be performed by the engine 300 executing software defined by a machine learning toolkit—e.g., Dlib, for example, as discussed above. Such software, for example, can implement a computer vision, facial recognition or convolutional network algorithm that identifies the deep features and/or raw data of image content. In some embodiments, such analysis can be implemented using any known or to be known deep learning architecture or algorithmic technique, such as, but not limited to, DNN, ANNs, CNNs, and deep belief networks.

According to some embodiments, for example, the disclosed deep learning methodology employs CNNs (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, rectified linear unit (ReLU) layer, pooling layer, dropout layer and loss layer, as understood by those of skill in the art. When used for image discovery, recognition and similarity, CNNs produce multiple tiers of deep feature collections by analyzing small portions an image.

For purposes of this disclosure, the data/metadata of an image, identified via the CNN software, can include, but are not limited to, visual characteristics of the images characterized (or categorized and labeled) by color features, texture features, type features, edge features and/or shape features, and the like. The results of these collections are then tiled so that they overlap to obtain a better representation of the image; which is repeated for every CNN layer. CNNs may include local or global pooling layers, which combine the outputs of feature clusters.

Thus, for example, according to some embodiments, Step 404 involves parsing, via applied toolkit defined software, each image in the set to identify the raw image data for each image, as discussed above. The raw data for each image is then translated into an image feature vector having a dimensional value proportional to the pixel value of each image. According to embodiments of the present disclosure, the feature vector is a result of forward propagation of the raw data values through the layers of the CNN. For example, using a 4096 pixel product image, such propagation results in a 4096 dimensional feature vector which provides an indication as to the types, positions and other informative information related to visual characteristics of an image (a user's eyes, eyebrows, forehead, nose, hairline, lips, mouth, facial hair, ears, chin, jawline, skin tone, and the like).

Figure 5:
FIG. 5 illustrates a non-limiting embodiment for identifying features of a digital representation of a user according to embodiments of the present disclosure.

According to some embodiments, the processing that occurs via Step 404 can involve identifying the existence and location of each facial feature within the image set, as illustrated in FIG. 5. That is, FIG. 5 illustrates a set of 12 training images (item 500 which was identified from Step 402), where each image depicts a sample face. Each face has depicted thereon a set of dots outlining the features of the users face, that are detected and modeled via the toolkit software executed in Step 404.

Figure 6:
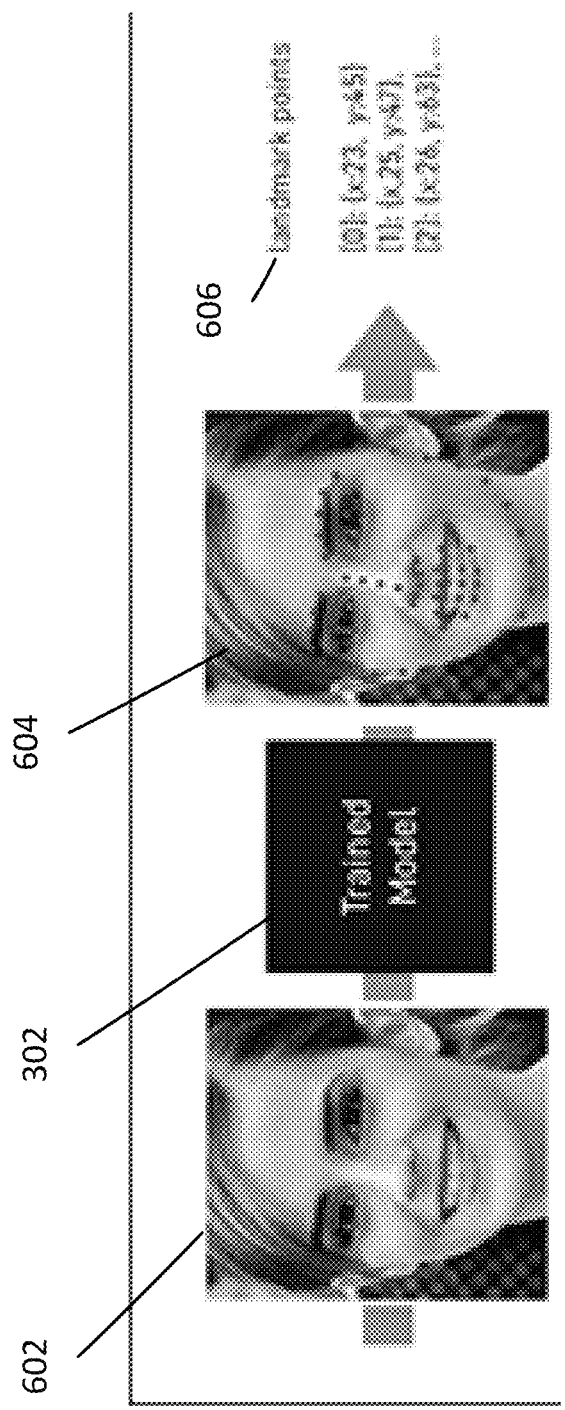
FIG. 6 illustrates a non-limiting embodiment for identifying features of a digital representation of a user according to embodiments of the present disclosure.

For example, as illustrated in FIG. 6, which provides an example of Steps 402-404 and FIG. 5, training image 602 is identified, which depicts a woman's face. Applying AI module 302, image 602 is analyzed and the "landmarks" of the user's face are detected. These "landmarks" are identified by the small circles that outline the woman's eyebrows, eyes, nose, mouth and jawline—item 604. Using the AI module 302's executed toolkit software, as discussed above, the characteristics of these features are mapped and the landmark data for the woman's features are determined, as illustrated in item 606. This information is then fed back to the AI module 302 for training upon analyzing subsequent images, which enables the increased speed and resource efficiency in identifying other facial features in other images.

Thus, in Step 406, where having determined the visual characteristics for each image, the AI module 302 is trained using the visual characteristics (e.g., referred to as landmarks of each face of each image). As discussed in more detail below in relation to FIG. 7, the trained AI module 302 is utilized to detect the facial features/characteristics of a user's face that will ultimately have an item fit and overlaid within an AR view provided by the UI of the AR application.

Figure 7:
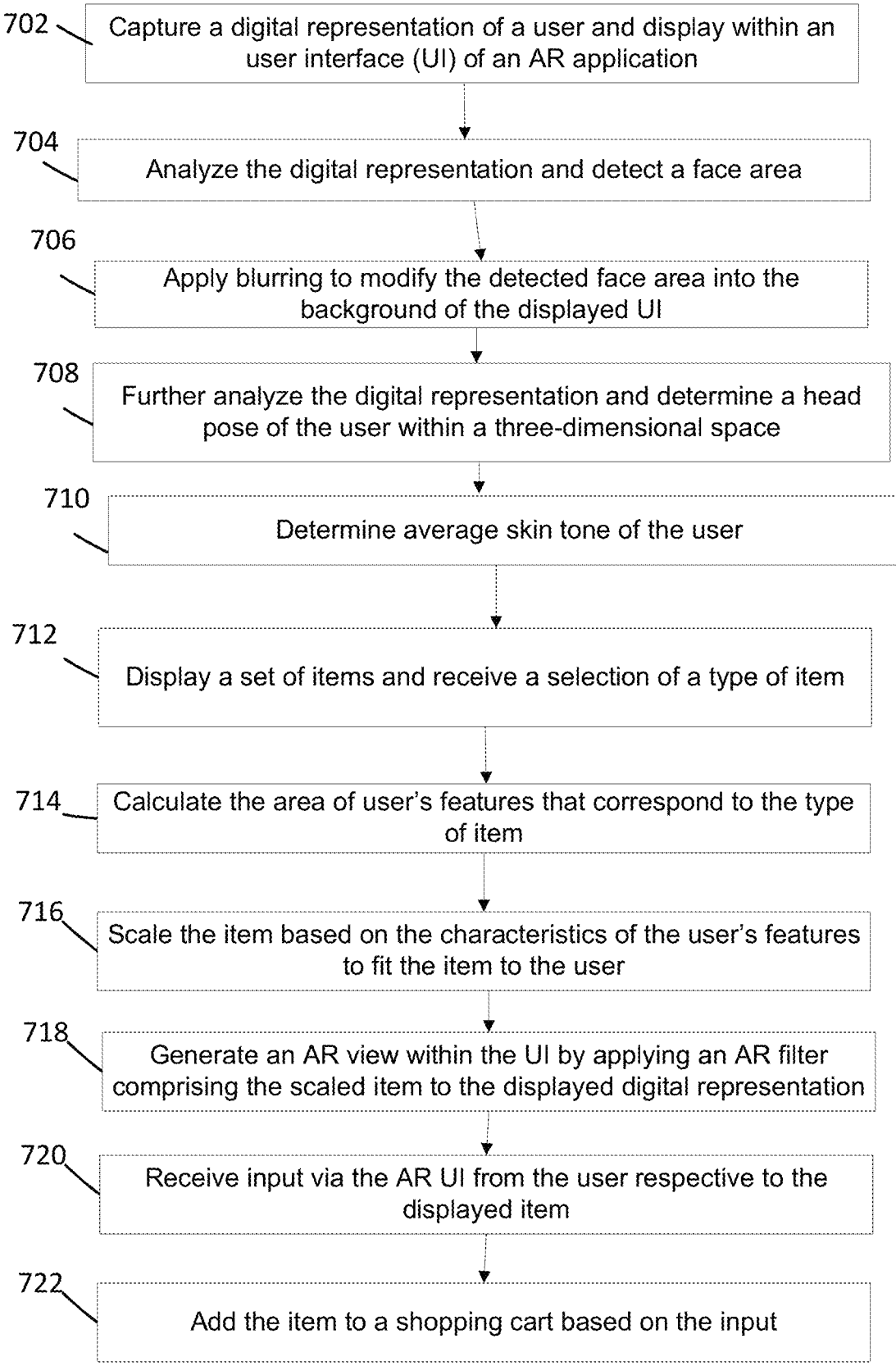
FIG. 7 is a flow diagram illustrating components of an exemplary AR system in accordance with embodiments of the present disclosure.

Turning to FIG. 7, Process 700 depicts a data flow where the disclosed AR framework provides a user with an AR experience enabling the user to accurately view how a piece of jewelry will look and appear on the user should the user actually be wearing the jewelry. The AR engine 300 provides a user with the ability to select a piece of jewelry, whereby the AR application executing on the user's device accurately fits and displays the jewelry to the user's digital representation being depicted on the display of the user's device.

According to some embodiments of Process 700 of FIG. 7, Step 702 of Process 400 is performed by the user recognition module 304 of the AR engine 300; Steps 704-710 and 714 are performed by the AI module 302; Steps 712 and 716 are performed by the item module 306; and Steps 718-720 are performed by the display module 308.

Process 700 begins with Step 702 where a digital representation of a user is captured and displayed. In some embodiments, the captured digital representation (e.g., an image or live-feed of the user) of the user can be resultant of a user using a camera situated on their device (e.g., the front end or back end camera). This, therefore, involves a user viewing a real-time viewing of themselves through the camera lens.

In some embodiments, the digital representation can be a captured photograph or video of the user. While the disclosure herein will focus on the "real-time" representation of a user viewing themselves through a camera lens (referenced as an "image" or "digital representation," interchangeably), it would be understood by those of skill in the art that the functionality discussed herein is applicable to photographs, videos or animated photographs (e.g., Graphics Interchange Format (GIF) files), and the like, without departing from the scope of the instant disclosure.

The captured image from Step 702 is displayed within a graphical user interface (UI) of the AR application the user is executing on his/her device. The UI, as discussed herein, is utilized for displaying the user's image, displaying a set of items, and displaying the item as overlaid the user's image via the AR engine, as illustrated in FIGS. 11A-11D, and discussed in more detail below.

In some embodiments, Step 702 can first involve launching the AR application, upon which the capturing and display of the user's image can then occur.

Figure 8:
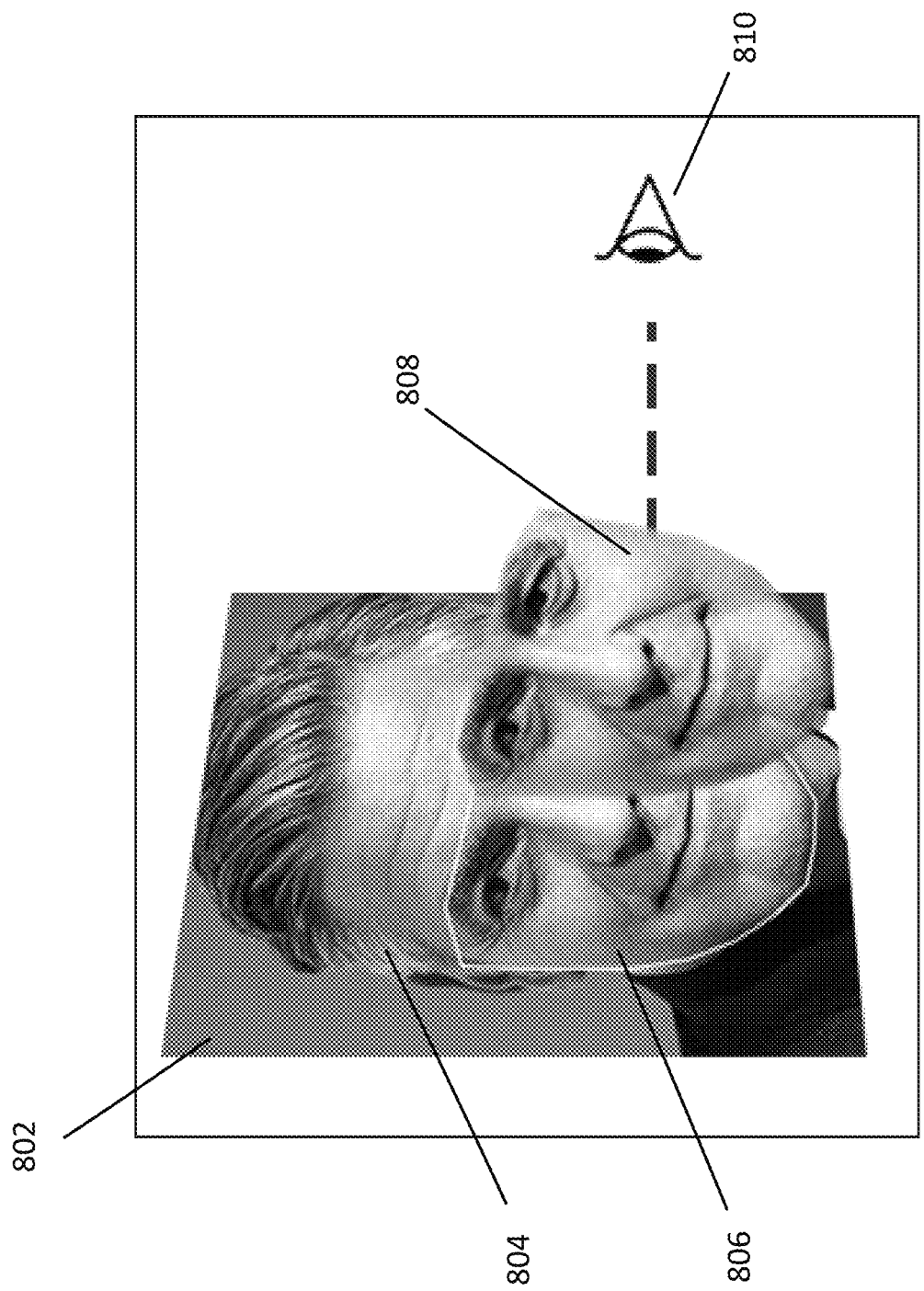
FIG. 8 illustrates a non-limiting embodiment for identifying features of a digital representation of a user according to embodiments of the present disclosure.

Step 704 involves analyzing the digital representation of the user and detecting a face area of the user from within the digital representation. According to some embodiments, the trained AI module 302, via the implemented toolkit software as discussed above, analyzes the user's image and identifies the facial features of the user. Then, based on these features, the face area of the user is determined. For example, as illustrated in FIG. 8, the user's image 804 is displayed within UI 802, and upon the analysis and detection occurring in Step 704, the user's face is identified—item 806.

In Step 706, upon detecting the face of the user within the digital representation of the captured image of the user, a blurring effect (or blurring filter) is applied so that the representation of the user is modified such that the detected face area is moved, adjusted or modified into the background of the UI. This enables the subsequent overlaying of the item without altering the display of the item or user. According to some embodiments, the edges of the face are determined based on facial features of the user, and a blur (or smoothing) effect is applied so that the face blends into the background. In some embodiments, the user's face 806 is copied (item 808) so that the original depiction of the face is not altered, and the modified copy can be overlaid on top of the original face 806. Therefore, as shown in FIG. 8, the smoothing and "sending to back" nature of Steps 704-706 are not viewable by the user (as depicted by the user's perception or eye—item 810).

In Step 708, engine 300 further analyzes the image of the user, and determines a head pose of the user within a three-dimensional (3D) space. Step 708 addresses the known "perspective-n-point" (PNP) problem in computer vision. That is, Step 708 involves implementing any known or to be known computer vision algorithm or technology to determine the 3D spatial orientation and alignment of a user's head. By way of a non-limiting example, engine 300 can implement OpenCV software to perform Step 708.

Figure 9:
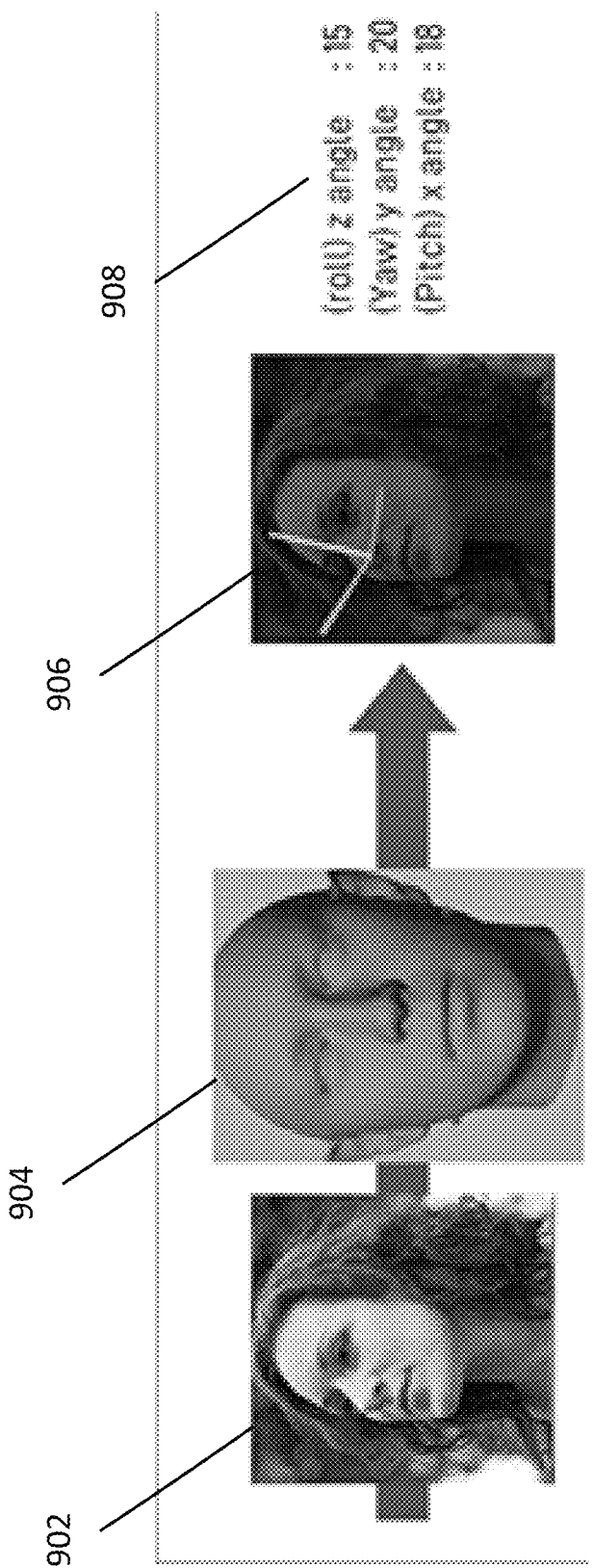
FIG. 9 illustrates a non-limiting embodiment for identifying features of a digital representation of a user according to embodiments of the present disclosure.

According to some embodiments, Step 708 involves extracting a predetermined set of the face points from the user image. An example of the processing in Step 708 is depicted in FIG. 9, where face points of the woman's eyes, chins, mouths, and nose are demarked by the dots in those associated areas of her face—item 902. Then, a standard 3D projection is created based on these points, as illustrated in item 904. The features of the projection (from item 904) correspond/match those of the woman's features from item 902. These two points are then processed by engine 300 executing solvePNP logic provided by OpenCV, which results in the head rotation estimation in 3D space, as illustrated item 906. As illustrated in FIG. 9, item 908 depicts the values of the characteristics of the user's head in 3D space.

One of skill in the art would understand that the implementation of solvePNP and OpenCV is non-limiting, as any type of known or to be known computer-vision and/or PNP algorithm, technique or mechanism could be used to determine the head pose in 3D space.

In Step 710, the average skin tone of the user is then determined. The average skin tone is based on the detected skin tone of the user's facial features from within the detected face. In some embodiments, the skin tone detection is performed to improve accuracy of how the item will look when displayed as overlaid the user's image. That is, for example, how will the colors of the item contrast the user's skin tone, for example.

In some embodiments, Step 710 involves selecting a predetermined number of locations from within the user's detected face—e.g., selecting the user's forehead, tip of the nose and cheek. The colors of these areas are then identified via computer vision, facial recognition and/or neural network software, which can be executed in a similar manner as discussed above in relation to Step 404. The average of these colors is then computed, which provides an average (or general) determination (or value) of the skin tone of the user.

In Step 712, a set of items is displayed to the user, from which the user makes a selection as to a type of item. The set of items, for example, can be a set of jewelry items that include, earrings and necklaces. In some embodiments, a set of stores can first be displayed, where upon the selection of a store, the store's items can then be displayed.

Figure 11A:
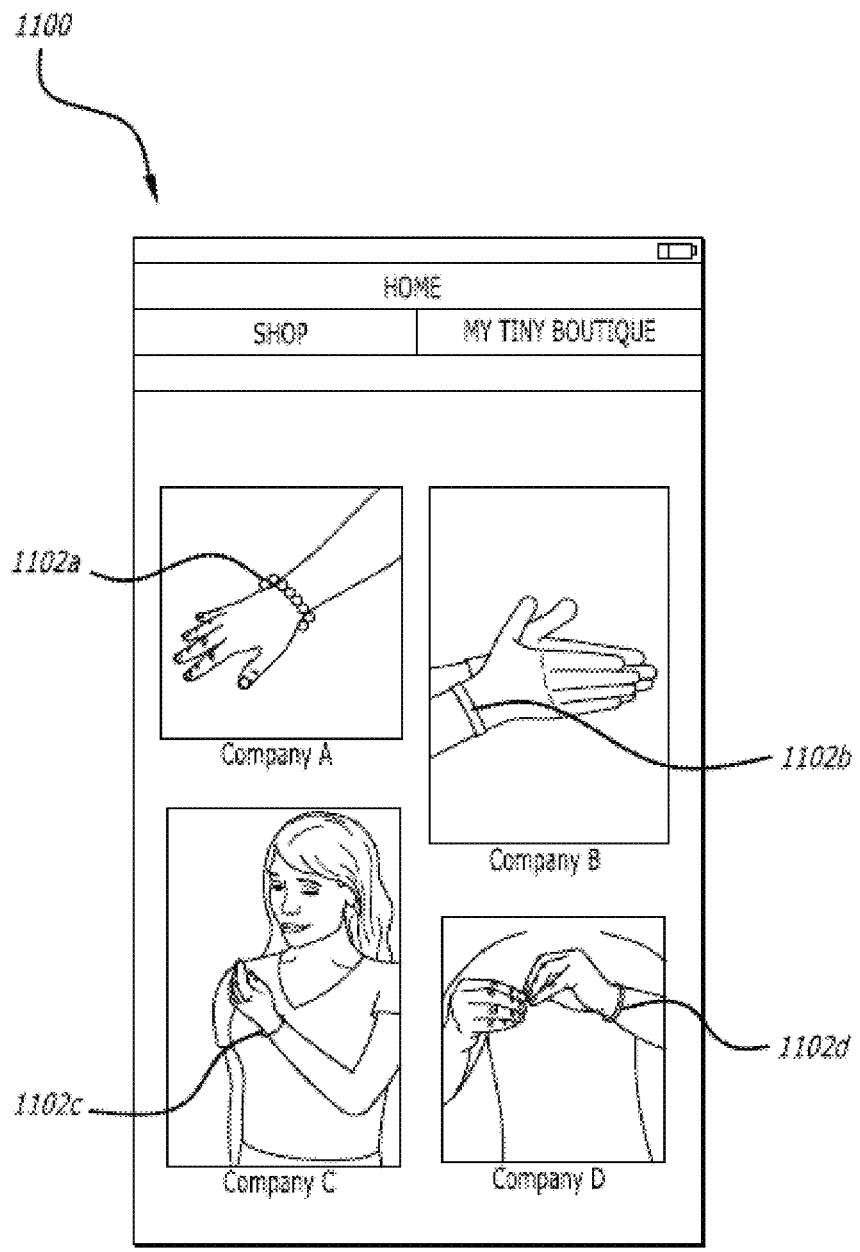
FIGS. 11A-11D illustrate non-limiting embodiments of the AR experience discussed herein according to embodiments of the present disclosure.

For example, FIG. 11A illustrates UI 1100, which depicts icons for a set of stores. The icons are depicted as the scrollable set of items 1102a-1102d, which correspond to online stores provided by the AR application for company A-D, respectively. Upon the user selecting a store, a set of items sold or provided by the selected store can be provided. In some embodiments, the type of item can be displayed on a different sub-interface provided by the AR application. For example, upon a user selecting a store from those displayed in UI 1100 of FIG. 11A, the user can then be displayed UI 1110 of FIG. 11B.

In UI 1110, the depiction of the user is displayed—item 1112, which was captured in Step 702. Additionally, a type of item selection menu (or tabbed view) is displayed—items 1105a and 1105b, which respectively corresponds to earrings and necklaces provided by the selected store. In the displayed example embodiment of UI 1110, the earrings tab 1105a is selected. UI 1110 depicts a set of earrings 1116 provided by the store, where the available earrings for purchase are displayed. For example, in a non-limiting manner, the earring items 1116 are provided in a horizontally displayed scrollable set of items that is overlaid the user's image 1112.

As discussed in more detail below respective to Steps 714-720, the user can select (and has in the displayed embodiment) earring item 1114a from within earring set 1116, which is then displayed as being worn by the user—item 1114.

Figure 11B:
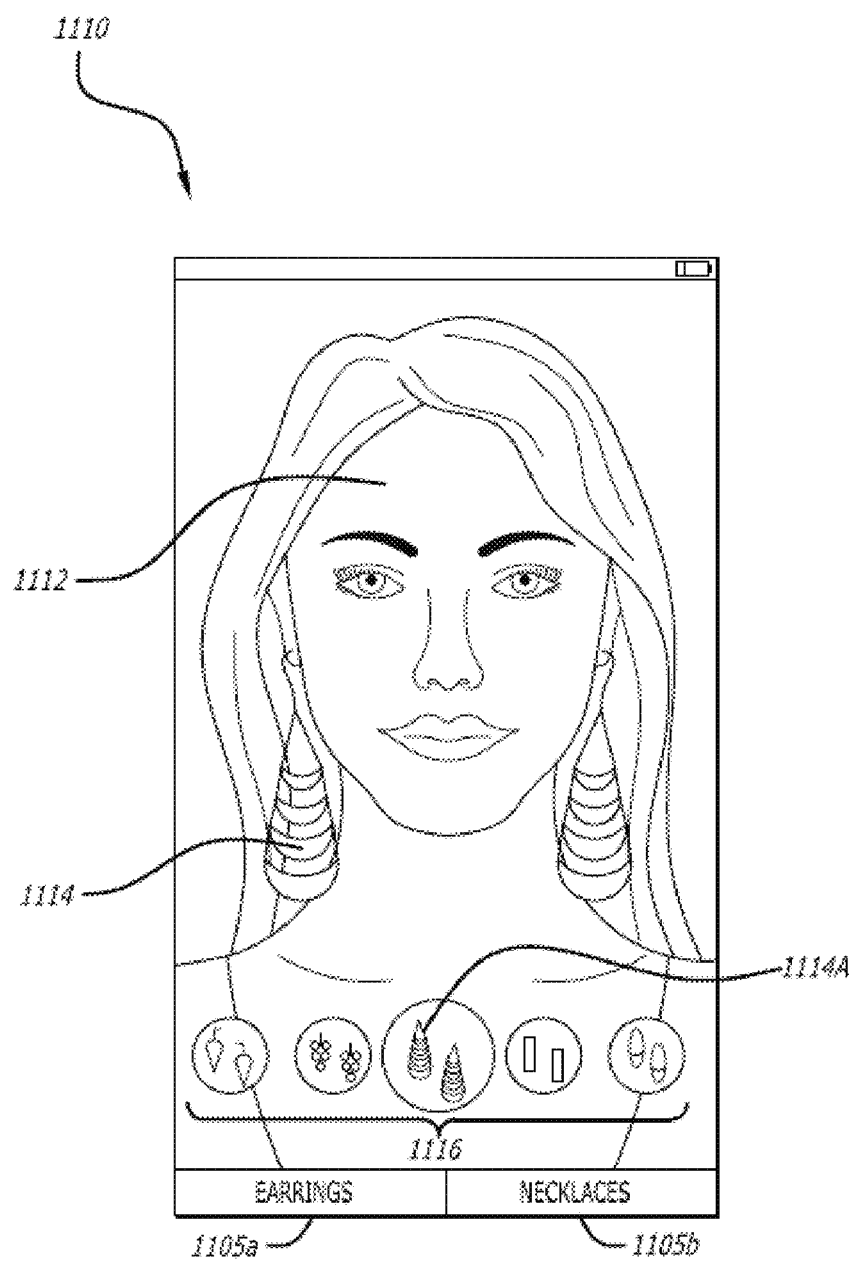
Figure 11C:
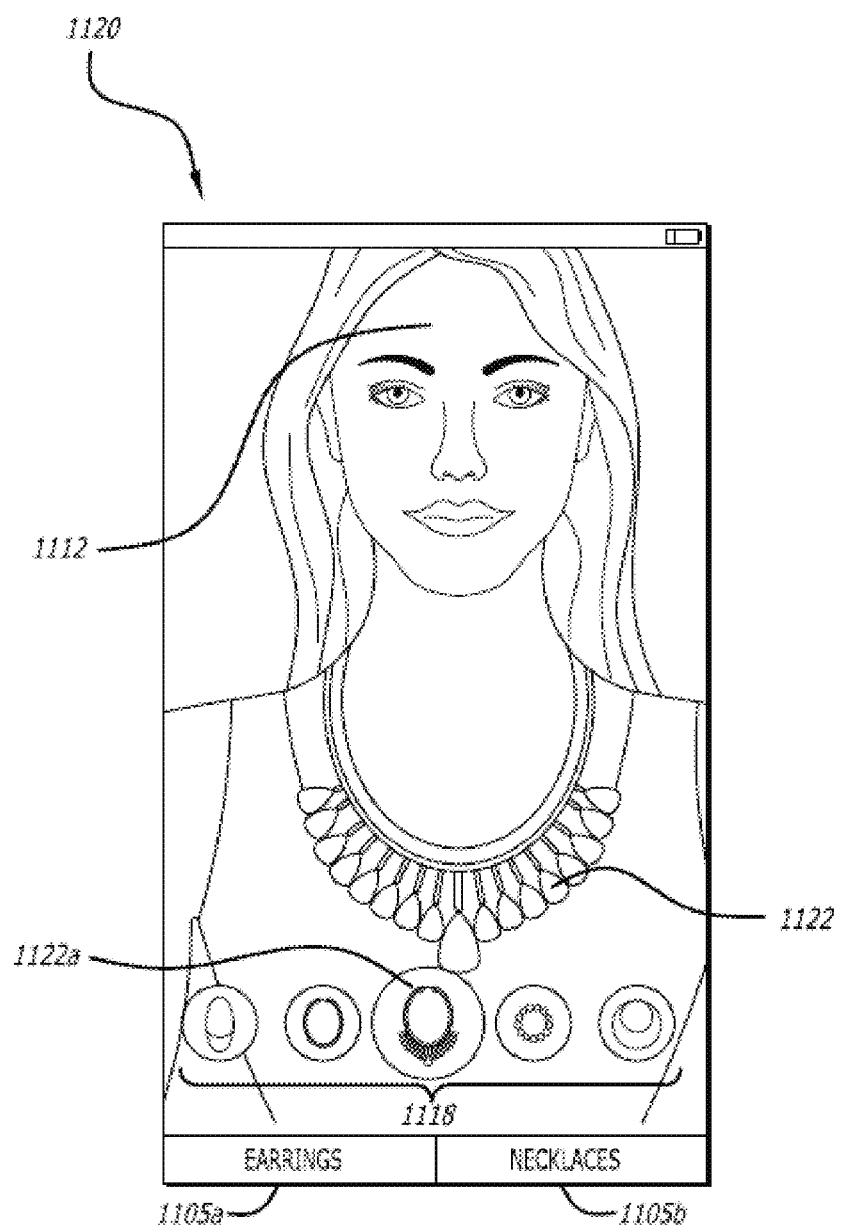

In another non-limiting example, upon the user selecting a store from UI 1100, the user can be displayed UI 1120 of FIG. 11C. In some embodiments, the user can toggle back and forth from UI 1110 and UI 1120 (of FIGS. 11B and 11C, respectively) based on the selection of/interaction with tabs 1105a and 1105b.

In UI 1120, in a similar manner to UI 1110, the user is depicted—item 1112. The type of item selection menu (or tabbed view) is displayed—items 1105a and 1105b, which respectively correspond to earrings and necklaces provided by the selected store. In UI 1120, the necklace tab 1105b is selected. UI 1100 depicts a set of necklaces 1120 provided by the store, where the available necklaces for purchase are displayed. For example, in a non-limiting manner, the necklace items 1120 are provided in a horizontally displayed scrollable set of items that is overlaid the user's image 1112.

As discussed in more detail below respective to Steps 714-720, the user can select (and has in the displayed embodiment) necklace item 1122a from within necklace set 1120, which is then displayed as being worn by the user—item 1122.

Continuing with Process 700, upon the user selecting an item to view as an AR display in conjunction with his/her displayed image (from Step 712), the area (or position, used interchangeably) of the user's features that correspond to the type of item are calculated (or determined). Step 714. That is, if the user selected an earring, then the shape areas of the user's ears and/or sides of their face, for example, are to be determined. In a similar manner, if the user selected a necklace, then the area of the user's neck and/or jawline, for example, are to be determined, which will provide the proper neck-point for the necklace.

Figure 10:
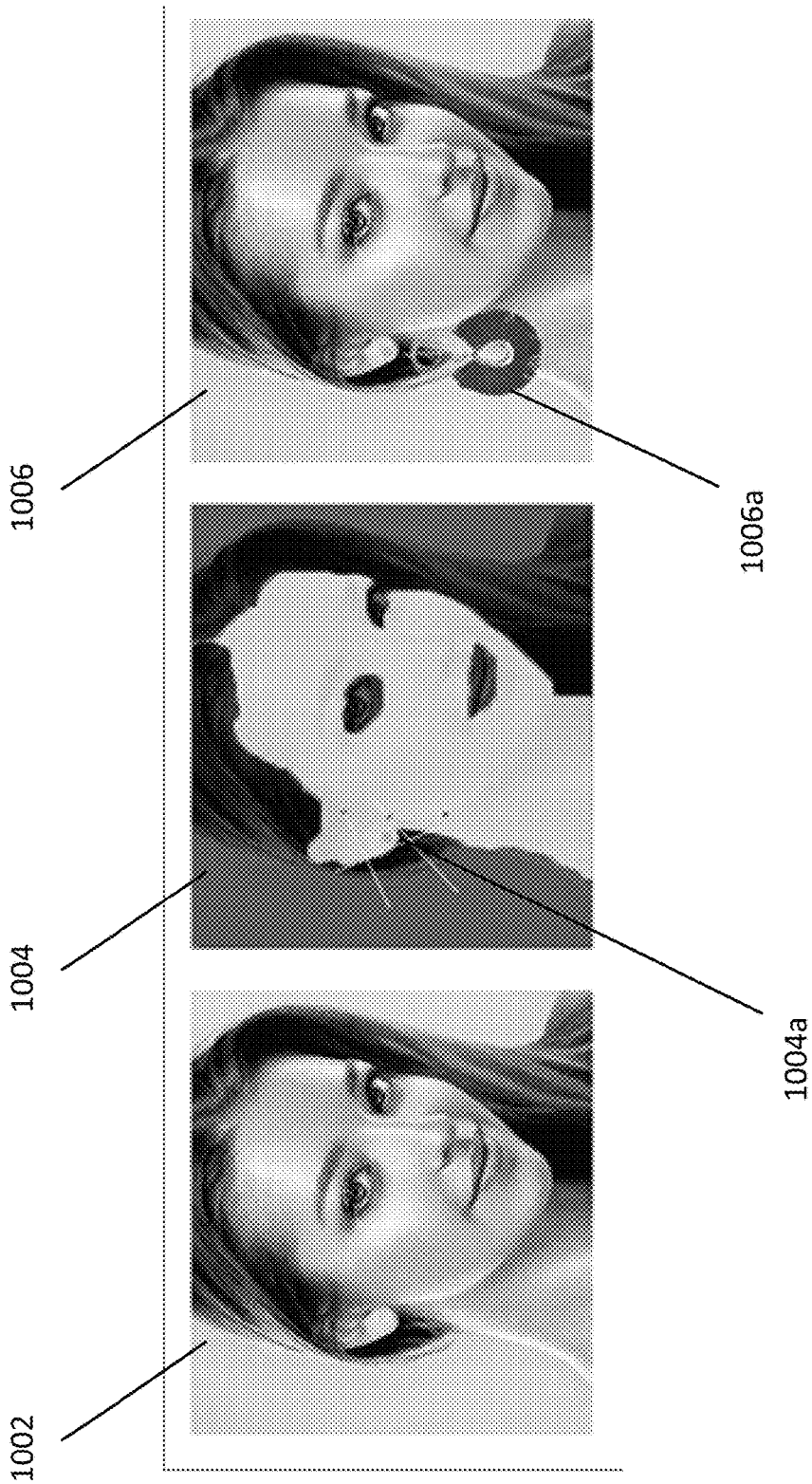
FIG. 10 illustrates a non-limiting embodiment for identifying features of a digital representation of a user according to embodiments of the present disclosure.

According to some embodiments, for a selected earring item (e.g., earring type of item), Step 714 involves identifying (or extracting) the feature information for the user's ear(s) (from the characteristics of the user's face as identified above), determining an average skin point based therefrom (determining the area the ear covers), which provides the shape area of the user's ear. For example, as illustrated in FIG. 10, item 1002 is the user's image. Item 1004 is the modelling of the user's ear features, which involves identifying the ear features and determining an average of their skin points. The points and arrows (item 1004a) illustrated in item 1004 demonstrate the determination of the user's ear shape area. Then based on these determinations, the location of the user's ear is identified, which also provides the ear's shape area, which as illustrated in item 1006, can be utilized to properly locate the position on the user's ear to display the selected earring item 1006a (e.g., attached to the earlobe).

In some embodiments, instead of utilizing the ear area, the AR module 302 can determine the shape area of the user's ear(s) based on application of its trained toolkit software, as discussed above.

According to some embodiments, for a selected necklace item (e.g., necklace type of item), Step 714 involves determining the position on the user's image to put the necklace. Engine 300 here applies the trained model of AR module 302 to analyze the neck characteristics of the user's image, then determines the average neck location based therefrom. The determination calculates the average neck location based on the 3D space of the user's head pose, which produces the final necklace position.

In Step 716, the items (e.g., their displayed characteristics including, but not limited to, size, orientation and/or alignment) can be scaled or adjusted based on the user's features to fit the item to the specific characteristics of the user.

According to some embodiments, the head rotation and size information, which can be determined, derived or otherwise identified from the 3D space of the user's pose, the features of the user's image and/or the calculated area from Step 714, can be leveraged to adjust the items size and/or offset values. This enables earrings and/or necklaces to be properly displayed despite a user's head being rotated and/or tilted.

Figure 12:
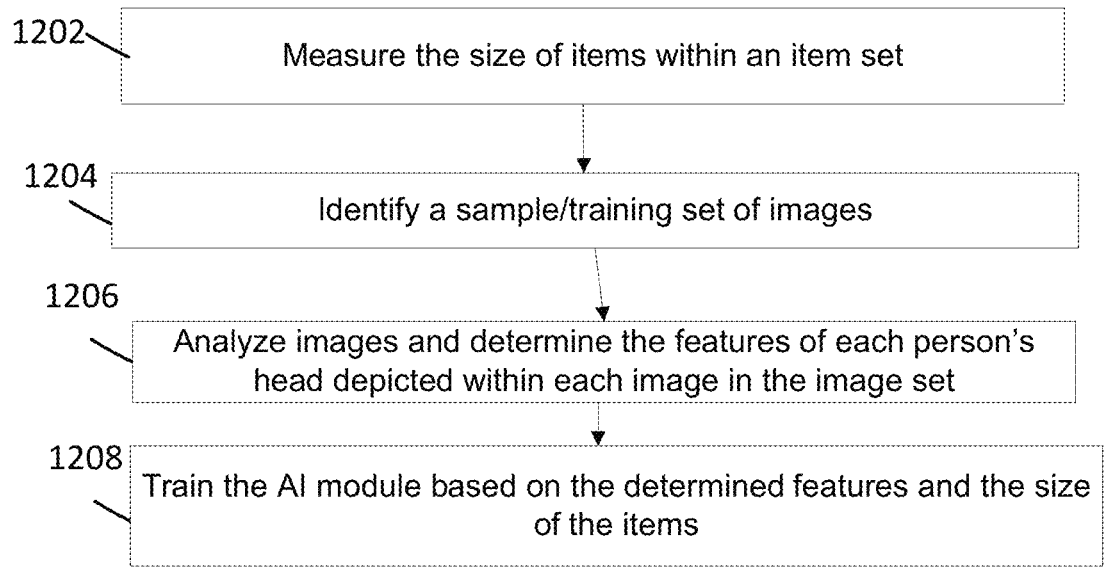
FIG. 12 is a flow diagram illustrating components of an AR system in according to embodiments of the present disclosure.

Turning to FIG. 12, Process 1200 details disclosed mechanisms for how the engine 300 scales items to properly be displayed on a user's captured image. Steps 1202-1208 of Process 1200 are performed by AI module 302 of AR engine 300.

Process 1200 begins with Step 1202 where the size of items within an item set are collected. As discussed above, the item set can be a set of necklaces or earrings, for example. Thus, Step 1202 involves determining and/or identifying the specific size, length and/or overall measurements of the item.

In Step 1204, a set of images are identified. In a similar manner as discussed above in relation to Step 402 of FIG. 4, a set of images is collected, retrieved or otherwise identified, and these images provide a training/sample dataset of images depicting a person's head.

While the discussion herein will focus on analyzing a person's head, it should not be construed as limiting, as one of skill in the art would understand that analyzing differing features of a person's depiction within a captured image would not alter or change the scope of the present disclosure.

In Step 1206, the AI module 302 analyzes the images and determines the features of each person's head depicted within the set of images. Step 1206 is performed in a similar manner as discussed above in relation to Step 404 of FIG. 4. That is, for example, each image in the identified set from Step 1202 is analyzed in order to determine visual characteristics associated with a person's depicted head within each image. This enables the system to measure the width and height of different head sizes as a person's head changes position from straightforward, to a left facing angle and a right facing angle.

Figure 13:
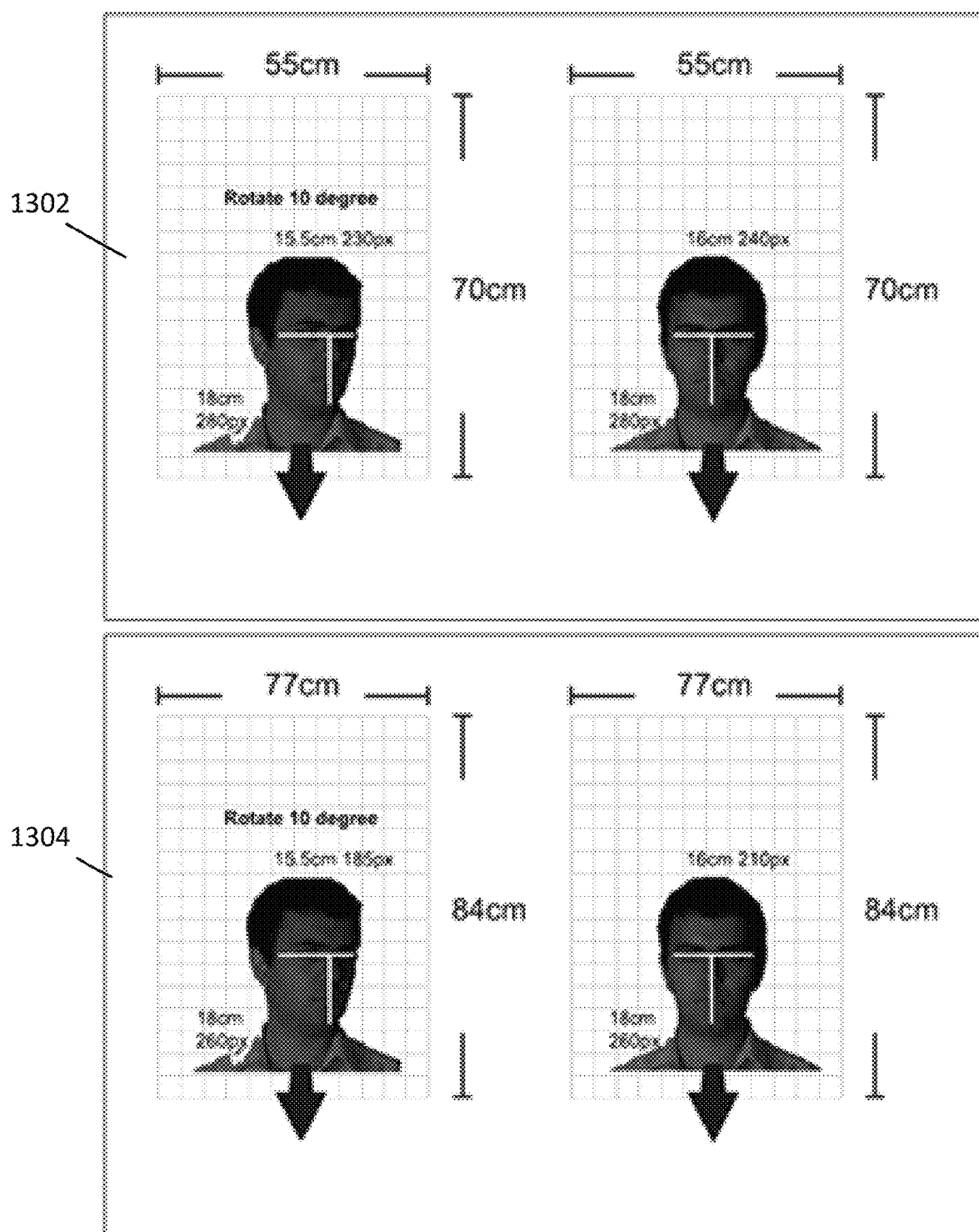
FIG. 13 is a non-limiting embodiment for scaling items based on real-time captured user images according to embodiments of the present disclosure.

In some embodiments, as depicted in FIG. 13, the width measurement determines the distance between left and right edge of the face around the ear area. Also depicted in FIG. 13, the height measurement involves the distance between center of eyes to chin. And, the head rotation is determined via the steps of Processes 400 and 700, as discussed above.

For example, as depicted in FIG. 13, items 1302 and 1304 respectively provide an example embodiment where a person's head rotation is analyzed for two different size images (e.g., the image size or displayed person's representation being respective to the person's distance to a camera on a smartphone—e.g., 70 cm away).

Turning back to FIG. 12, in Step 1208, once the measurement values of the depicted faces are determined (from Step 1206), the AI module is trained based on these values and the size information of the items (determined from Step 1202). The training of AI module 302 is performed in a similar manner as discussed above in relation to Step 406 of FIG. 4. The training occurring in Step 1208 enables the engine 300 to accurately scale a selected item to the displayed head of the user depicted within the UI.

In some embodiments, device information (e.g., which smartphone manufacture or provider) used to capture the images can be leveraged in order to assist in training the AI module 302. That is, some devices have different camera positioning and/or angles, and this information can be further utilized when training the system to determine the features of a user's head. Thus, Step 1208's training can further be based on the device information which can increase the accuracy of a user's feature detection and item positioning and sizing.

Therefore, turning back to FIG. 7, Step 716, in some embodiments, involves determining the pixel values of the user's head (or face), which can be based on feature information determined from Steps 702-710, such that not only is the facial/head features detected, the head angle is also detected. Based on this determination, the engine 300 leverages the trained AI module 302 (from Process 1200 of FIG. 12) to fit the scaled item to the user's depiction.

In some embodiments, Step 716 can further leverage device information about the device used to capture the image in Step 702. As mentioned above, this can be added to the information that is fed to the module 302 such that the scaling can be further based on which device the user is using, which would increase the accuracy of how the item is scaled.

In Step 718, an AR filter is generated and applied, and the AR filter comprises the scaled item. The filter is applied to the UI of the AR application such that it is overlaid (or integrated to) the user's image (that was blended into the background, as in Steps 704-706). According to some embodiments, based on how much the user's head is rotated left or right, the item is placed either in front or behind the blended face for a seamless 3D effect.

And, in some embodiments, should the user change head orientation, the AR engine 300 can monitor the user's movements and adjust how the item is displayed, and such adjustment is based on reprocessing the steps of Process 700 and 1200 (e.g., Steps 708, 714-718 and Steps 1202-1208, respectively). For example, if a user's head is facing left, and her right ear is showing, the right earring will initially be completely viewable while only a portion of the left earing may only partially be viewable; however, should the user rotate her head to the right, then the AR filter will be dynamically modified so that the left earring will be completely viewable while only a portion of the right earing may only partially be viewable.

As illustrated in FIG. 11B, the selected necklace 1114a from items 1116 is displayed within UI 1110, thereby providing an AR view that allows the user to see how the earrings 1114 would look like on the displayed image of the user 1112. In another non-limiting example, as illustrated in FIG. 11C, the selected necklace 1122a from items 1120 are displayed within UI 1120, thereby providing an AR view that allows the user to see how the necklace 1122 would like on the displayed image of the user 1112.

In Step 720, after providing the AR view of the item displayed on the user's digital representation (or image), the user can provide input indicating a desire to purchase the item. The input can be any type of known or to be known input, including, but not limited to, voice, text, a mouse selection, haptic or touch or swipe input, and the like. For example, the user of FIG. 11C can single or double tap (or swipe up, in another example) on the displayed necklace.

In some embodiments, the user can provide input respective to any part of the displayed AR UI view, and in some embodiments, a specific "swipe to by" interactive icon or object may be displayed which can be interacted with and trigger Step 722, as discussed below.

Figure 11D:
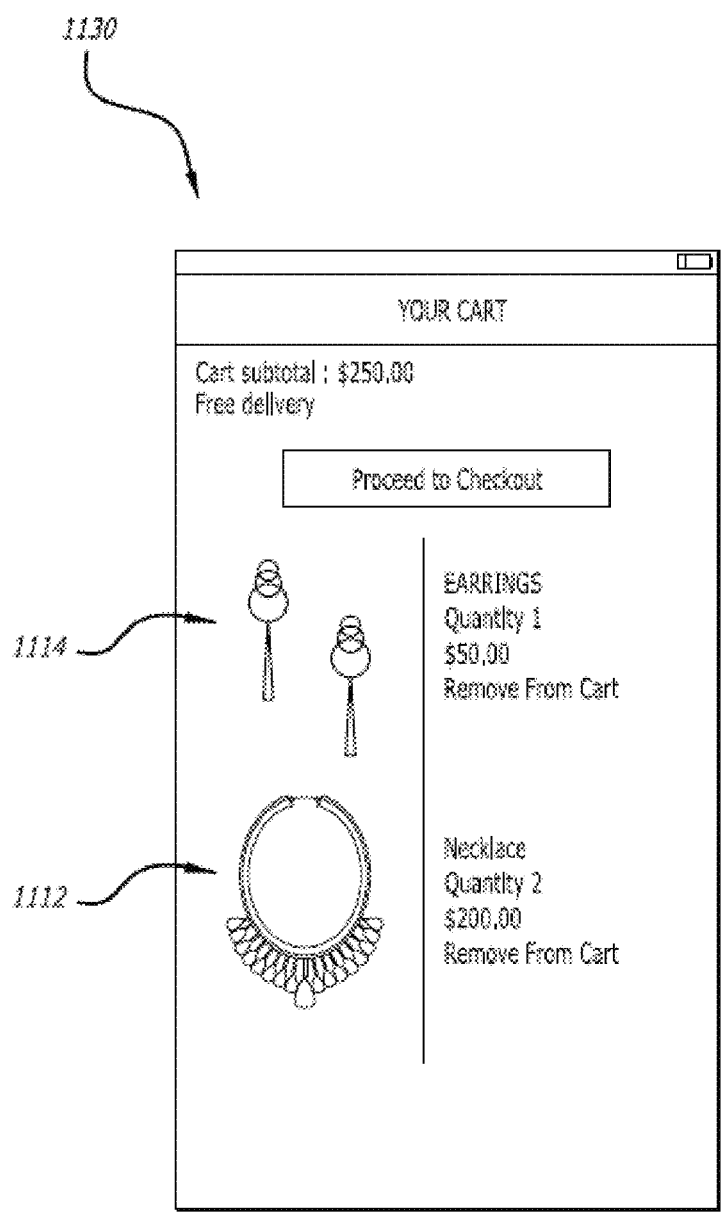

As a result, the item can be added to a shopping cart of the AR application. Step 722, as illustrated in FIG. 11D. UI 1130 provides the shopping cart which displays the items the user has selected. For example, the user viewed the earrings 1114 via UI 1110, and selected them to be added to his/her cart. The user also viewed the necklace 1122 via UI 1120, and selected them to be added to his/her cart. Therefore, the cart UI 1130 provides the items added therein, which can then be purchased from the selected store or item provider via the AR application.

FIG. 14 is a work flow process 1400 for serving related digital media content based on the information associated with a selected and AR displayed item, as discussed above in relation to FIGS. 3-13. In some embodiments, the content can be associated with or comprising advertisements (e.g., digital advertisement content). Such content can include or be based upon, but is not limited to, information associated with a displayed item and/or the user upon which the item is displayed. Such information can be referred to as "item information" for reference purposes only.

Process 1400 discusses embodiments for engine 300 to provide functionality for applications to partner with third party entities enabling the entities to provide digital content for display within a graphical user interface (UI) based on the item information determined, discovered, derived or otherwise identified from Processes 400, 700 and 1200, as discussed above. In some embodiments, the entities may be separate entities from the AR application provider, and in some embodiments, the entities may be one of the stores from FIG. 11A, as discussed above.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 1402, item information is identified. As discussed above, the item information can be based any of the information utilized, determined and/or generated from/during the AR display mechanisms outlined above with respect to FIGS. 3-13. For purposes of this disclosure, Process 1400 will refer to single displayed item and user within the AR experience; however, it should not be construed as limiting, as any number of items and/or users can form such basis, without departing from the scope of the instant disclosure.

In Step 1404, a context is determined based on the identified item information. This context forms a basis for serving content related to the user, integrated item and/or the compiled AR view. The context can be based on the user's information, or can be based on the type of item (e.g., is the item a necklace or earrings, who or what is the provider of the item, the color or shape of the item, the price of the item, and the like).

For example, a user has selected an item that is displayed via the AR technology provided above. The item is a necklace that is made and produced by company X. Therefore, the context can be based on the company's information—for example, the context can be "company X." This context can be leveraged in order to identify digital content related to additional deals for the user from "company X", or its competitors. For example, the context can be leveraged to provide a "40% off coupon" to the user for subsequent purchases from the same store/company.

In some embodiments, the identification of the context from Step 1404 can occur before, during and/or after the analysis detailed above with respect to Processes 400, 700 and 1200, or it can be a separate process altogether, or some combination thereof.

In Step 1406, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 1408, the server searches the database for a digital content item(s) that matches the identified context. In Step 1410, a content item is selected (or retrieved) based on the results of Step 1408. In some embodiments, the selected content item can be modified to conform to attributes or capabilities of the page, interface, platform, application or method upon which the content item will be displayed, and/or to the application and/or device for which it will be displayed. In some embodiments, the selected content item is shared or communicated via the application the user is utilizing to view, render and/or interact with an item and/or AR view. Step 1412. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:
capturing, via a device, a real-time image of a user, the image comprising a digital representation of the user;
displaying, via the device, the image within a user interface (UI) associated with an augmented reality (AR) application executing on the device;
analyzing, via the device, the image, and based on said analysis, determining visual characteristics of the user represented by the digital representation;
determining, via the device, based on said determined visual characteristics, a head pose of the user within a three-dimensional (3D) space, said head pose comprising information indicating a 3D spatial orientation and alignment of the user's head within said image;
receiving, at the device, information related to an item, said item being a specific type of item;
determining, via the device, based on said received item information, a position on said user within said image that corresponds to said type of item;
determining, via the device, a shape and size of the position based on the type of item and the determined visual characteristics of the user associated with said position;
scaling, via the device, display characteristics of the item based, at least in part, on the determined shape and size of the position;
determining, based on the determined shape and size of the position, an area of the position on the user within the image;
modifying, by the device, the image based on the determined area, the modification causing a specific portion of the image that corresponds to the determined area to be moved to a background of the UI while a remaining portion of the image remains unmodified in the UI;
generating, via the device, an AR filter comprising a displayable version of the scaled item, wherein a position of the displayable version of the item within the filter corresponds to the position within said image; and
applying, within the UI, the AR filter to the modified image, the AR filter being overlaid the specific portion of the image that was moved to the background of the UI.

2. The method of claim 1, further comprising:
displaying, within said UI, interactive objects each corresponding to an entity providing a set of items;
receiving, via the UI, selection of an interactive object;
displaying, within said UI, a set of items provided by the store associated with the selected interactive object; and
receiving input related to an item from said set of items, wherein said received item information corresponds to the item being interacted with via said input.

3. The method of claim 1, further comprising:
identifying an online dataset of training images;
identifying a set of images from said dataset;
analyzing each image in the image set, and based on said analysis, determining visual characteristics of each image; and
training the AR application to recognize said visual characteristics of the user based on said determination.

4. The method of claim 3, wherein said analysis and determination is based on execution of software defined by an algorithm provided by a machine learning toolkit.

5. The method of claim 1, further comprising:
identifying a set of locations within said detected face area;
executing software defined by facial recognition software that causes the device to determine color values for each location;
determining an average color value based on said determined color values, wherein said average color value indicates the average skin tone of the user within said image.

6. The method of claim 1, wherein said displayed characteristics of the item comprise size, orientation and alignment information.

7. The method of claim 1, wherein said real-time image of the user is a live-feed of a user captured by a camera of the device.

8. The method of claim 1, wherein said device is a mobile device of the user.

9. The method of claim 1, further comprising:
causing communication, over the network, of information related to said item to a third party platform to obtain a digital content item comprising third party provided digital content associated with said information;
receiving, over the network, said digital content item; and
communicating said digital content item to said device for display in association with the UI.

10. A non-transitory computer-readable storage medium tangibly encoded with computer-executable instructions, that when executed by a processor associated with a device, performs a method comprising the steps of:
capturing, via the device, a real-time image of a user, the image comprising a digital representation of the user;
displaying, via the device, the image within a user interface (UI) associated with an augmented reality (AR) application executing on the device;
analyzing, via the device, the image, and based on said analysis, determining visual characteristics of the user represented by the digital representation;
determining, via the device, based on said determined visual characteristics, a head pose of the user within a three-dimensional (3D) space, said head pose comprising information indicating a 3D spatial orientation and alignment of the user's head within said image;
receiving, at the device, information related to an item, said item being a specific type of item;
determining, via the device, based on said received item information, a position on said user within said image that corresponds to said type of item;
determining, via the device, a shape and size of the position based on the type of item and the determined visual characteristics of the user associated with said position;
scaling, via the device, display characteristics of the item based, at least in part, on the determined shape and size of the position;
determining, based on the determined shape and size of the position, an area of the position on the user within the image;
modifying, by the device, the image based on the determined area, the modification causing a specific portion of the image that corresponds to the determined area to be moved to a background of the UI while a remaining portion of the image remains unmodified in the UI;
generating, via the device, an AR filter comprising a displayable version of the scaled item, wherein a position of the displayable version of the item within the filter corresponds to the position within said image; and applying, within the UI, the AR filter to the modified image, the AR filter being overlaid the specific portion of the image that was moved to the background of the UI.

11. The non-transitory computer-readable storage medium of claim 10, further comprising:
displaying, within said UI, interactive objects each corresponding to an entity providing a set of items;
receiving, via the UI, selection of an interactive object;
displaying, within said UI, a set of items provided by the store associated with the selected interactive object; and
receiving input related to an item from said set of items, wherein said received item information corresponds to the item being interacted with via said input.

12. The non-transitory computer-readable storage medium of claim 10, further comprising:
identifying an online dataset of training images;
identifying a set of images from said dataset;
analyzing each image in the image set, and based on said analysis, determining visual characteristics of each image; and
training the AR application to recognize said visual characteristics of the user based on said determination.

13. The non-transitory computer-readable storage medium of claim 12, wherein said analysis and determination is based on execution of software defined by an algorithm provided by a machine learning toolkit.

14. The non-transitory computer-readable storage medium of claim 10, further comprising:
identifying a set of locations within said detected face area;
executing software defined by facial recognition software that causes the device to determine color values for each location;
determining an average color value based on said determined color values, wherein said average color value indicates the average skin tone of the user within said image.

15. A device comprising:
a processor; and
a non-transitory computer-readable storage medium for tangibly storing thereon program logic for execution by the processor, the program logic comprising:
logic executed by the processor for capturing, via the device, a real-time image of a user, the image comprising a digital representation of the user;
logic executed by the processor for displaying, via the device, the image within a user interface (UI) associated with an augmented reality (AR) application executing on the device;
logic executed by the processor for analyzing, via the device, the image, and based on said analysis, determining visual characteristics of the user represented by the digital representation;
logic executed by the processor for determining, via the device, based on said determined visual characteristics, a head pose of the user within a three-dimensional (3D) space, said head pose comprising information indicating a 3D spatial orientation and alignment of the user's head within said image;
logic executed by the processor for receiving, at the device, information related to an item, said item being a specific type of item;
logic executed by the processor for determining, via the device, based on said received item information, a position on said user within said image that corresponds to said type of item;
logic executed by the processor for determining, via the device, a shape and size of the position based on the type of item and the determined visual characteristics of the user associated with said position;
logic executed by the processor for scaling, via the device, display characteristics of the item based, at least in part, on the determined shape and size of the position;
logic executed by the processor for determining, based on the determined shape and size of the position, an area of the position on the user within the image;
logic executed by the processor for modifying, by the device, the image based on the determined area, the modification causing a specific portion of the image that corresponds to the determined area to be moved to a background of the UI while a remaining portion of the image remains unmodified in the UI;
logic executed by the processor for generating, via the device, an AR filter comprising a displayable version of the scaled item, wherein a position of the displayable version of the item within the filter corresponds to the position within said image; and
logic executed by the processor for applying, within the UI, the AR filter to the modified image, the AR filter being overlaid the specific portion of the image that was moved to the background of the UI.

16. The device of claim 15, further comprising:
logic executed by the processor for displaying, within said UI, interactive objects each corresponding to an entity providing a set of items;
logic executed by the processor for receiving, via the UI, selection of an interactive object;
logic executed by the processor for displaying, within said UI, a set of items provided by the store associated with the selected interactive object; and
logic executed by the processor for receiving input related to an item from said set of items, wherein said received item information corresponds to the item being interacted with via said input.

* * * * *